Sept. 17, 1940.  W. A. BARNES  2,214,872
ELECTRICAL APPLIANCE
Filed Jan. 31, 1938

INVENTOR.
William A. Barnes.
BY
Woodling and Krost,
ATTORNEY.

Patented Sept. 17, 1940

2,214,872

UNITED STATES PATENT OFFICE 2,214,872

ELECTRICAL APPLIANCE

William A. Barnes, Mansfield, Ohio, assignor to Dominion Electrical Manufacturing Company Application January 31, 1938, Serial No. 187,881

11 Claims. (Cl. 219—19)

My invention relates to electrical appliances and more particularly to electric appliances, such for example, as sandwich toasters and waffle irons.

An object of my invention is the provision of an electrical appliance having exchangeable grill plates which may be conveniently and readily exchanged to convert a sandwich toaster into a waffle iron and vice versa.

Another object of my invention is the provision of an electrical appliance having exchangeable grill plates to convert a sandwich toaster into a waffle iron, and vice versa, and having a heating element controlled by an adjustable temperature responsive device to give different ranges of heating duties for toasting sandwiches and baking waffles.

Another object of my invention is the provision of resiliently mounting a temperature responsive device which controls the energization of the heating element of the electrical appliance, so that the temperature responsive device is urged against an exchangeable grill plate to cause it to govern the energization of the electrical heating element of the electrical appliance substantially in accordance with the temperature of the grill plate.

Another object of my invention is the provision of a resiliently mounted temperature responsive device which permits the exchange of grill plates by unfastening and removing the grill plate from the casing of the electrical appliance and positioning the exchanged grill plate in the casing by depressing the resiliently mounted responsive temperature device until the exchanged grill plate rests upon the casing after which it is fastened by a suitable fastening means.

Other objects and a fuller understanding of my invention may be had by referring to the following description and claims, taken in conjunction with the accompanying drawing, in which:

Figures 4, 5:
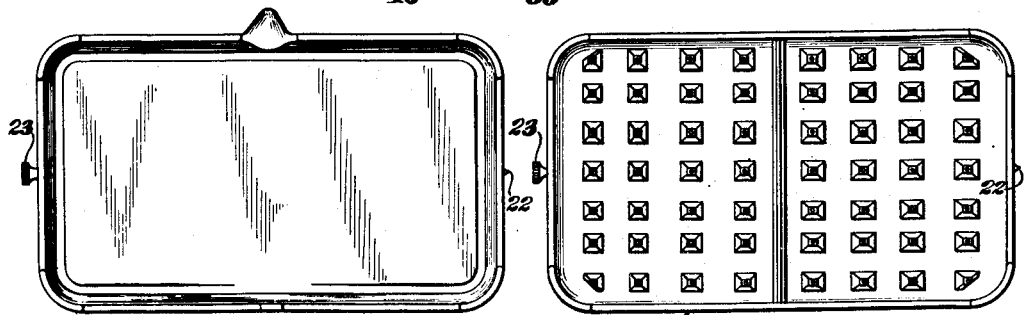
Figure 4 shows a plan view of a grill plate which is used when my electrical appliance is employed as a sandwich toaster.
Figure 5 shows a plan view of a grill plate which is used when my electrical appliance is employed as a waffle iron.

With reference to the drawing, my invention may be incorporated into an electrical appliance which may be converted from a sandwich toaster to a waffle iron, and vice versa, by changing the grill plates. When the electrical appliance is used as a sandwich toaster, a pair of plates such as shown in Figure 4 is used and when my electrical appliance is used as a waffle iron, a pair of plates such as shown in Figure 5 are used.

In sandwich toasters and in waffle irons, the appliance may be constructed of a lower base part indicated generally by the reference character 10 and an upper hinged part indicated generally by the reference character 11. In using the appliance, the upper hinged part 11 is positioned over the lower base part 10, between which sandwiches may be toasted or waffles baked. The lower part 11 may comprise a casing 12 having a peripheral edge 13 defining a relatively large space portion into which the exchangeable grill plates may be positioned. The lower portion of the casing 12 may be flanged laterally outwardly, as indicated by the reference character 14 to form a base to which suitable handles 15 may be attached by means of the illustrated screw or other suitable means. Before the handles 15 are mounted, a bottom plate 16 may be positioned under the casing 12 and securely fastened thereto by the same screws which hold the handles 15 to the laterally extending base portion 14.

Figure 1:
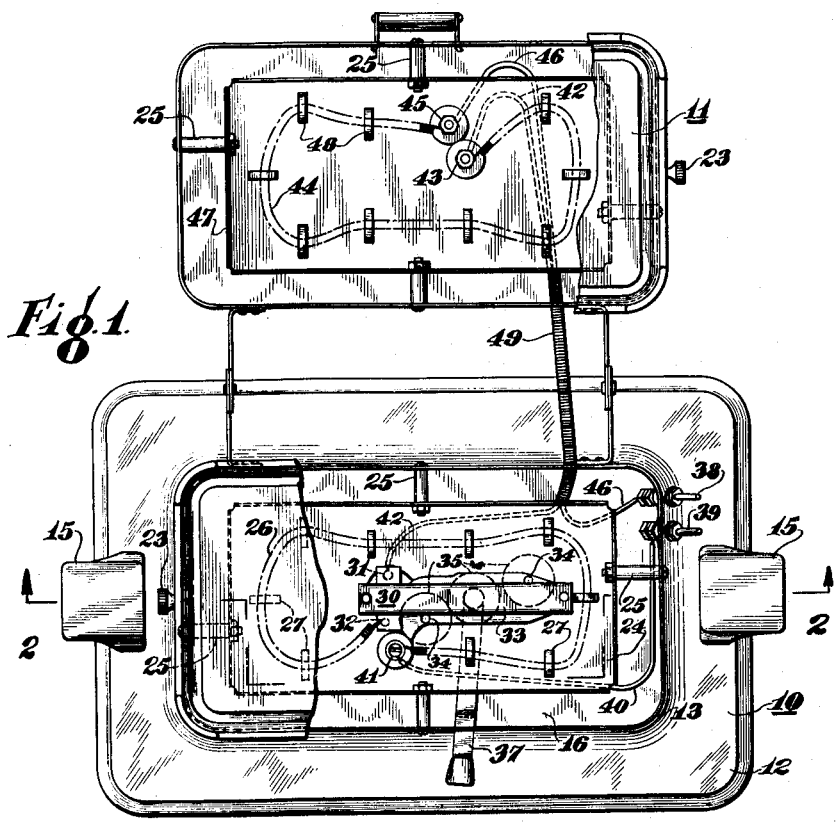
Figure 1 represents an electrical appliance embodying the features of my invention.
Figures 2, 3:
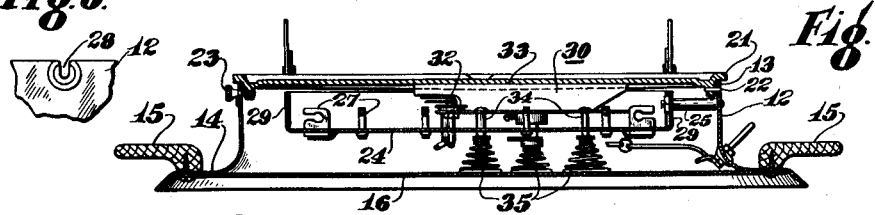
Figure 2 is a cross-sectional view of my electrical appliance taken along the line 2—2 of Figure 1.
Figure 3 is a fragmentary and enlarged view of a portion of the casing into which a thumb screw may be inserted to fasten an exchangeable grill plate to the casing.

Positioned in the relatively large open space portion and resting upon the peripheral edge 13 defined thereby, is a grill plate, which in Figure 1 is fragmentarily shown as a sandwich toaster grill. The exchangeable grill plates may have a shoulder 21 which rests upon the peripheral edge 13 to restrain the grill plates against lateral movement. As illustrated, one end of the grill plates may be provided with a pin 22 which is arranged to be inserted into a registered opening in the side wall of the casing 12 and the other end of the grill plates may be provided with a thumb screw 23 which is arranged to be inserted into a slotted opening 28 of the casing 12 and abutted against a depressed portion surrounding the slot, see the fragmentary view in Figure 3. Therefore when removing an exchangeable grill plate from the casing 12, it is only necessary to unscrew the thumb screw 23 and elevate the left-hand end of the grill plate until the pin 22 on the right-hand end clears the registered opening in the side wall of the casing 12, after which the entire plate may be removed. The grill plates may be inserted in the casing in the reverse order.

Positioned below the grill plate in the casing 12 is a supporting plate 24 suitably fastened to the side walls by the lateral fastening means indicated by the reference character 25. These lateral fastening means may comprise a hollow tube through which a screw passes having a nut threadably engaging the end thereof for holding the supporting plate 24 in spaced relation from the side walls of the casing 12. Fastened to the bottom of the supporting plate 24 are a plurality of insulated brackets 27 around which the heating element 26 may be wound and held in spaced relation from the grill plate. The supporting plate 24 is provided with marginal side wall means 29 which are flanged upwardly towards the grill plate and which confine the heat from radiating laterally.

Positioned between the supporting plate 24 and the underneath side of the grill plate is a temperature responsive device indicated by the reference character 30 and which may be of the same construction as that shown in my copending application filed, January 31, 1938, Serial No. 187,883 for Temperature responsive devices. The upper surface 33 of the temperature responsive device is flat and is arranged to engage the underneath side of the grill plate. On the underneath side of the temperature responsive device 30 are provided guide posts 34 which extend through openings in the supporting plate 24. To the lower ends of the guide posts 34 are fastened coil springs 35 having their lower portions enlarged and resting on the bottom plate 16. The coil springs 35 urge the flat engaging surface 33 of the temperature responsive device 30 against the underneath side of the grill plate, so that the functioning of the temperature responsive device 30 is substantially governed in accordance with the temperature of the grill plate. Lateral support is given to the temperature responsive device 30 by the guide posts 34 which pass through openings in the supporting plate 24. The setting of the temperature responsive device 30 may be governed by an adjustment lever 37 which extends externally of the casing through an elongated slot, so that it may be adjustably set to any desired temperature.

The construction of the upper part 11 of my appliance and the exchange of the grill plates may be somewhat similar to that of the lower part 12 and is arranged to have a supporting plate 47 suitably carried by the casing of the upper part. Positioned in the base of the supporting plate 47 are a plurality of insulating brackets 48 for holding the heating element 44 having its ends connected to the terminals 42 and 45.

The heating elements 26 and 44 and the temperature responsive device 30 are arranged to be connected in circuit relation with the terminal pins 38 and 39 which are mounted upon, but electrically insulated from, the end side wall of the casing 12. The flow of the current may be traced as follows, beginning with the terminal 39, the current flows through the conductor 40, the terminal 41, the heating element 26, the terminal 32, the temperature responsive device 30, the terminal 31, the conductor 42, which is carried in a flexible conduit 49 to the terminal 43 of the upper part 11, the heating element 44, the terminal 45, and the conductor 46 back through the flexible conduit 49 to the other terminal 38.

The resilient mounting of the temperature responsive device 30 permits the ready exchange of grill plates in the lower casing 12 by unfastening the thumb screws 23 and removing the grill plate from the casing 12 and positioning the exchanged grill plate over the opening defined by the peripheral edge 13, such that the pin 22 registers with the opening in the side wall of the casing after which the left-hand of the grill may be lowered while at the same time depressing the resiliently mounted temperature responsive device 30 until the thumb screw 23 enters the slot 28 upon the left-hand side wall of the casing and the exchanged grill plate rests upon the peripheral edge 13 all around the casing, after which the grill plate may be fastened by turning the thumb screw 23. The coil springs 35 resiliently urge the flat surface 33 of the temperature responsive device 30 against the underneath side of the grill plate, so that the temperature of the grill plate governs the operation of the temperature responsive device for controlling the energization of the heating element. The grill plates in the upper casing may be exchanged in a similar manner to that described for the lower casing. Therefore, my invention provides for giving an exchange of grill plates to convert the appliance from a sandwich toaster to a waffle iron, or vice versa, while at the same time affording adjustable temperature settings to accommodate different ranges of heating duties for toasting sandwiches and baking waffles.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An electrical appliance comprising, in combination, a casing having a peripheral edge defining an open space, a grill plate resting on the peripheral edge and covering the open space, electrical heating means positioned in the casing and spaced from the grill plate for heating the grill plate, a temperature responsive device for governing the energization of the heating means, adjustable means extending externally of the casing for adjustably setting the temperature responsive device, and means for resiliently mounting the temperature responsive device to urge it against the grill plate and to cause it to govern the energization of the electrical heating means substantially in accordance with the temperature of the grill plate.

2. An electrical appliance comprising, in combination, a casing having a peripheral edge defining an open space, a grill plate resting on the peripheral edge and covering the open space, a supporting plate mounted in the casing at a distance from the peripheral edge, electrical heating means positioned in the casing and spaced from the grill plate for heating the grill plate, insulated means carried by the supporting plate for holding the electrical heating means, a temperature responsive device for governing the energization of the heating means, said temperature responsive device being positioned between the supporting plate and the grill plate, guide means extending through the supporting plate for giving lateral support to the temperature responsive device, adjustable means extending externally of the casing for adjustably setting the temperature responsive device, and means for resiliently mounting the guide means and the temperature responsive device to urge the temperature responsive device against the grill plate and to cause the said temperature responsive device to govern the energization of the electrical heating means substantially in accordance with the temperature of the grill plate.

3. An electrical appliance comprising, in combination, a casing having a peripheral edge defining an open space, a grill plate resting on the peripheral edge and covering the open space, a supporting plate mounted in the casing at a distance from the peripheral edge, electrical heating means positioned in the casing and spaced from the grill plate for heating the grill plate, insulated means carried by the supporting plate for holding the electrical heating means, a temperature responsive device for governing the energization of the heating means, said temperature responsive device being positioned between the supporting plate and the grill plate, guide means extending through the supporting plate for giving lateral support to the temperature responsive device, adjustable means extending externally of the casing for adjustably setting the temperature responsive device and coil spring means for resiliently mounting the guide means and the temperature responsive device to urge the temperature responsive device against the grill plate and to cause the said temperature responsive device to govern the energization of the electrical heating means substantially in accordance with the temperature of the grill plate.

4. An electrical appliance comprising, in combination, a casing having a peripheral edge defining an open space, an exchangeable grill plate resting on the peripheral edge and covering the open space, electrical heating means positioned in the casing and spaced from the grill plate for heating the grill plate, a temperature responsive device for governing the energization of the heating means, adjustable means extending externally of the casing for adjustably setting the temperature responsive device, means for resiliently mounting the temperature responsive device to urge it against the grill plate and to cause it to govern the energization of the electrical heating means substantially in accordance with the temperature of the grill plate, and means for fastening the grill plate to the casing, said resilient mounting and the temperature responsive device being arranged to permit the exchange of grill plates by unfastening and removing the grill plate from the casing and positioning the exchanged grill plate over the opening and depressing the resiliently mounted temperature responsive device to enable the said exchanged grill to rest upon the peripheral edge and be fastened by the fastening means.

5. An electrical appliance comprising, in combination, a casing, a replaceable grill plate for said casing, means for fastening the grill plate to the casing, electrical heating means in said casing for heating said replaceable grill plate, a temperature responsive device in said casing for governing the energization of the heating means, and resilient means constraining said replaceable grill and said temperature responsive device in contact with each other to cause said temperature responsive device to govern the energization of the electrical heating means substantially in accordance with the temperature of the grill plate.

6. An electrical appliance comprising, in combination, a casing having a well therein, a replaceable grill plate for said well, means to fasten said replaceable grill to said casing, electrical heating means in said casing for heating said grill, a temperature responsive device in said casing for governing the energization of the heating means, means to set the temperature responsive device, and resilient means constraining said replaceable grill and said temperature responsive device in contact with each other to cause said temperature responsive device to govern the energization of the electrical heating means substantially in accordance with the temperature of the grill plate.

7. An electrical appliance comprising, in combination, a casing having an open space, an exchangeable grill plate covering the open space, means for fastening the grill plate to the casing, electrical heating means positioned in the casing and spaced from the grill plate for heating the grill plate, a temperature responsive device for governing the energization of the heating means, adjustable means extending externally of the casing for adjustably setting the temperature responsive device, and means for urging the grill plate and the temperature responsive device in contact engagement to cause the temperature responsive device to govern the energization of the electrical heating means substantially in accordance with the temperature of the grill plate.

8. An electrical appliance comprising, in combination, a casing having a bottom, a replaceable grill plate for said casing, means for fastening the grill plate to the casing, a substantially looped heating element in said casing for heating said replaceable grill plate, a temperature responsive device in said casing and substantially encompassed by said looped heating element, and compression means constraining said replaceable grill and said temperature responsive device in contact with each other to cause said temperature responsive device to govern the energization of the electrical heating means substantially in accordance with the temperature of the grill plate.

9. An electrical appliance comprising, in combination, a casing having a bottom, a replaceable grill plate for said casing, means for fastening said grill plate to said casing, a heating element in said casing, a reflecting pan having a bottom and positioned between said casing bottom and said grill plate to reflect part of the heat radiated by said heating element upon the said grill, a temperature responsive device in said casing to govern the energization of the electrical heating means substantially in accordance with the temperature of the grill plate, and resilient means mounted in said casing between the said casing bottom and the said reflecting pan bottom and extending through the said reflecting pan bottom to urge the temperature responsive device against the said grill plate.

10. An electrical appliance comprising, in combination, a casing, a replaceable grill plate for said casing, a temperature responsive device resiliently mounted in heat transfer relationship with said grill plate, a heating element mounted in said casing and adapted to heat said grill plate, said heating element being supported by a supporting plate which is adapted to reflect heat from the said element on to said grill plate, and means to adjust said temperature responsive device to govern the energization of the heating element.

11. An electrical appliance comprising, in combination, a casing, a replaceable grill plate for said casing, an electrical heating element mounted in said casing for heating said grill plate, a temperature responsive device to regulate the energization of the electrical heating element, said replaceable grill plate and said temperature responsive device being resiliently constrained to contact each other to cause said temperature responsive device to govern the energization of the electrical heating element substantially in accordance with the temperature of the grill plate.

WILLIAM A. BARNES.